United States Patent [19]
Sugahara

[11] Patent Number: 5,651,319
[45] Date of Patent: Jul. 29, 1997

[54] CAR BODY CARRIER

[75] Inventor: Takeshi Sugahara, Osaka, Japan

[73] Assignee: Daifuku Co., Ltd., Japan

[21] Appl. No.: 719,824

[22] Filed: Sep. 30, 1996

[30] Foreign Application Priority Data

Oct. 27, 1995 [JP] Japan .................... 7-279527

[51] Int. Cl.⁶ .................................................. B61B 10/04
[52] U.S. Cl. .................................... 104/162; 104/139
[58] Field of Search ................................ 104/139, 140,
104/162, 163; 198/732, 733

[56] References Cited

U.S. PATENT DOCUMENTS

| 3,407,750 | 10/1968 | Rantz | 104/162 |
| 3,832,953 | 9/1974 | Aaron | 104/162 |
| 4,194,449 | 3/1980 | Breau | 104/162 |
| 5,133,264 | 7/1992 | Belanger et al. | 104/162 |

FOREIGN PATENT DOCUMENTS 2721313  11/1978  Germany ................ 104/162

Primary Examiner—S. Joseph Morano
Attorney, Agent, or Firm—Schweitzer Cornman Gross & Bondell LLP

[57] ABSTRACT

A carrier of car bodies having front wheels and rear wheels mounted from respective front and rear axes, by rolling the car body on the wheels on a floor along a generally horizontal direction of carriage, the carrier having a front wheel direction regulator having right and left deflection preventors adapted for contacting the sides of the front wheels while permitting rotation of the front wheels for regulating the orientation of the front wheels to the direction of carriage; a front wheel holder having a rear holder disposed behind the front wheel for rotatingly pushing the car body forward in the direction of carriage, and a front holder for permitting rotation of the front wheels while preventing the car body from being pushed too far forward and away from said rear holder, the rear and front holders each having a free outer end and an inner end, and; a drive for moving the direction regulator the said holder in the direction of carriage.

9 Claims, 8 Drawing Sheets 5,651,319

CAR BODY CARRIER

FIELD OF THE INVENTION

The present invention relates to apparatus for carrying car bodies between conveying, inspecting and storage lines and the like apparatus such as is used for finishing or finished automobiles in an automobile plant.

BACKGROUND

The conventional methods for carrying automobiles or other car bodies with wheels between conveyors arranged in series such as to form a conveying line, or between a conveyor and a lifter, include: (i) driving a car body by an operator or a driver; (ii) transferring the car body onto a pallet and carrying the body on the pallet, as disclosed e.g. in Japanese Utility Model pre-examination Publication S.55-167,921 and Japanese Patent pro-examination Publication S. 60-19,611; or (iii) transporting the car body with a traction device engaged with it.

The method (i) requires a driver to be always available where car bodies are carried, resulting in a high cost.

The method (ii) requires large motive power and a large apparats for transferring a car body onto a pallet. In addition, the wheel positions, lifting positions, etc. depend on the types of car bodies, so that the mechanism and control of the transfer means is complex.

The method (iii) requires that the point of engagement of a traction means for different types of car bodies be changed, and therefore needs very complex apparatus. In addition, the direction of the wheels for steering of a car body being pulled is not fixed in the direction of carriage, so that it is difficult to carry the body precisely and smoothly along a carriage line.

SUMMARY OF THE INVENTION

It is the object of the present invention to provide an apparatus for carrying a car body precisely and smoothly without needing a driver or large motive apparatus and power.

A car body carrier according to the present invention is an apparatus having left and right wheels in the front and rear, which can idle, by moving the body along a carriage path with the wheels rotating on the floor. The carrier includes a regulator for the direction of the front wheel, a holder for the front wheel in its regulated angular orientation, and a drive for moving these means together along the conveying path. The front wheel orientation regulator has right and left deflection prevention members for contacting respective sides of the front wheels to permit rotation of these wheels and to regulate the direction of these wheels in the direction of carriage. The front wheel holder has rear holder members for contacting the peripheral surfaces of the front wheels behind the respective front wheels to push the wheels forward by permitting them to rotate. The front wheel holder also has front holder members each positioned in front of the respective wheels, to prevent them from moving forward and away from the rear holder members.

A car body is conveyed to the starting end of a carriage path by a conveyor. The deflection preventors of the front wheel direction regulator are put into contact with either the inner or the outer surfaces of the front wheels of the car body to orient and regulate the direction of these wheels, while the front holder members are positioned in front of the wheels. The drive then moves the deflection preventors and the holder members together along the path. This makes the rear holders push the front wheels forward to propel the car body along the conveying path. The front holder members in front of the front wheels prevent the car body from being moved forward by inertia faster than the rear holder members. The deflection preventors in contact with the front wheels prevent the direction of these wheels from deflecting or inclining from the direction of carriage. As a result, the car body is carried along the conveying path securely and smoothly at a specified speed. Because the front wheels are allowed to rotate by the various members contacting them, the car body can travel smoothly with the wheels rotating. Therefore, there is no need of a driver for driving a car body.

No large motive power is required, and no apparatus is required for transferring a very heavy car body onto a pallet for carriage. As a car body is merely pushed forward with its wheels rotating on the carriage floor, even a very heavy, large car body can bee smoothly and securely carried with relatively small thrust. Although the diameters of the front wheels and the distances between the wheels can vary between types of cars, the variation can be easily dealt with by the deflection preventors of the front wheel direction regulator and the holder members of the front wheel holder. It is therefore easy securely to put the desired moving operation into practice regardless of the types of car bodies carried.

BRIEF DESCRIPTION OF THE DRAWING

Other features and advantages of the present invention will be easily understood from the following detailed description with reference being had to the accompanying drawing, wherein.

DETAILED DESCRIPTION

The car body carrier of the present invention carries car body M with wheels by pushing the front wheels FW, which are idle wheels for steering, between the conveyors constituting the car conveying or carriage lines in plants or other facilities such as those for manufacturing, inspecting, lifting, elevating and storing cars, or on the conveying or carriage lines between the facilities. In the described embodiment of the present invention, the carrier conveys a car body M along the carriage path L of parallel conveyors for carrying a car body with the wheels supported on them to the specified position at which a car is removed.

As shown in FIGS. 1–4, the car body carrier includes a traveler 3, which can travel along the carriage path L. The traveler 3 is movably supported on guide rails 2R and 2L in the form of flat, vertical plates, which are laid opposite to each other on both sides of a square or rectangular groove 1 in the floor. The groove 1 is formed along the carriage lines in a space between right and left parallel conveyors RC and LC, constituting a conveyor line in the space between right and left divided carriage floors F. Right and left floating tables 9 are located at the outlet of the conveyor line comprised of conveyors RC and LC right and left. These tables are used to center the car body M on the conveyor. The traveler 3 includes a front wheel direction or orientation regulator 5 having lateral deflection preventors 4R and 4L, which are rollers for contacting the inner sides of the fight and left from wheels FW of the car body M.

Figure 2:
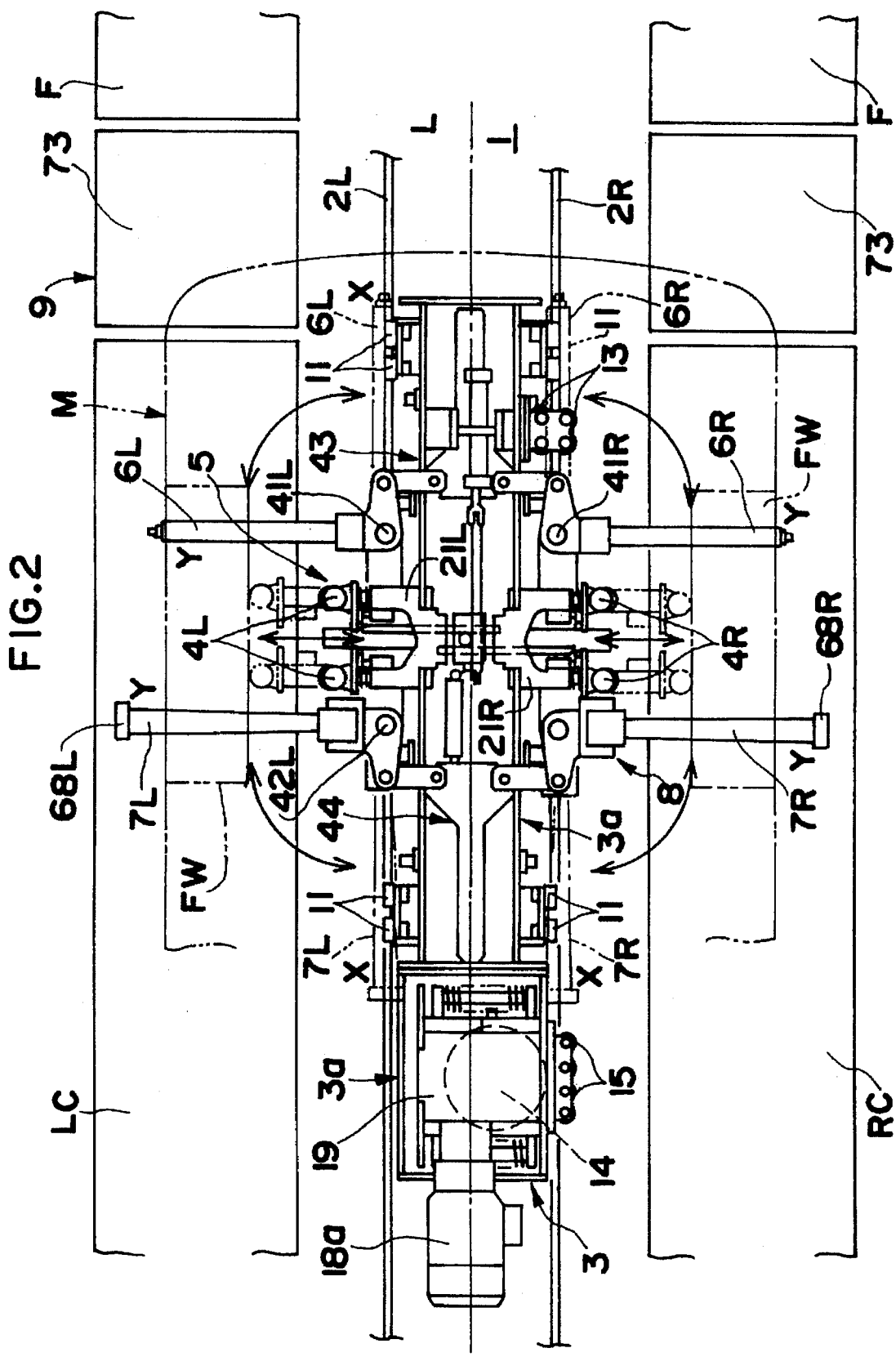
FIG. 2 is a plan view of the carrier.
Figure 3:
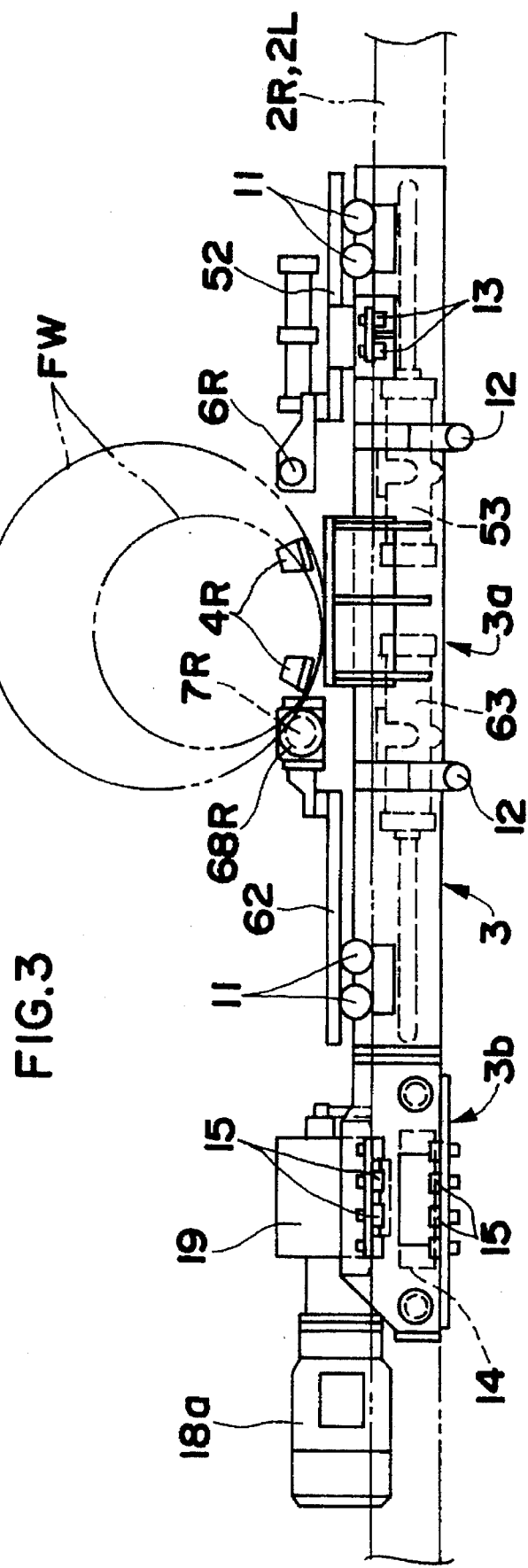
FIG. 3 is a side view of the carrier.
Figure 4:
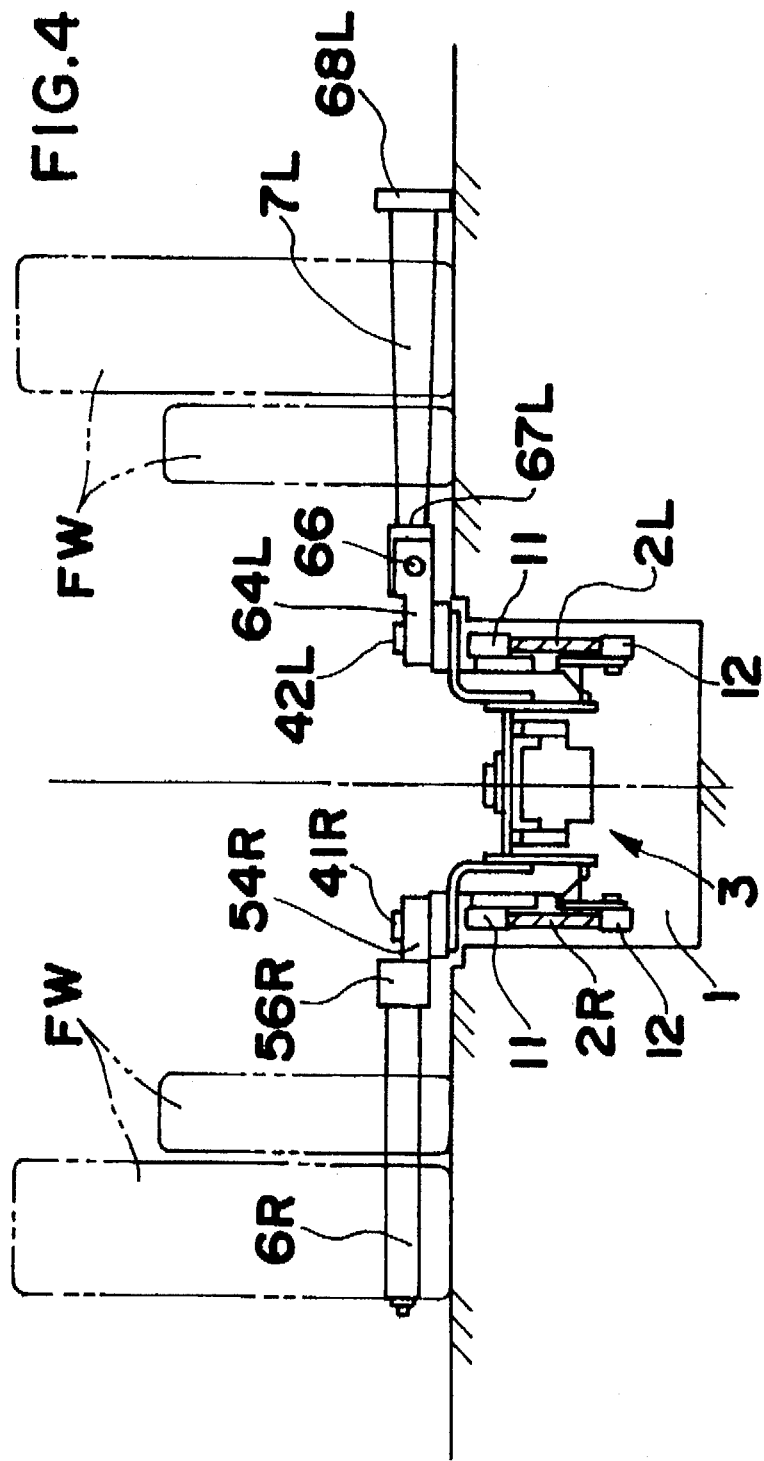
FIG. 4 is a front view partially in lateral cross-section of the carrier, showing the right front holder member and left-rear holder member of its front wheel holding means.

The traveler 3 further includes a front wheel holder 8, which has front hold members 6R and 6L and rear holder members 7R and 7L. The front holder member 6R and 6L are long rollers positioned in front of the wheels FW to restrict the front wheels from moving forward, and rear hold members 7R and 7L are long rollers positioned in the rear of the front wheels FW to push the front wheels forward. The traveler 3 is a drive for moving the front wheel direction regulator 5 and holder 8 together along the carriage path L. As shown in FIGS. 2–4, the traveler 3 includes a carriage 3a and a drive 3b.

The carriage 3a has front and rear supporting rollers 11, which roll on the upper surfaces of the guide rails 2R and 2L. The carriage 3a also has front and rear flotation- or relief-preventing rollers 12 (FIGS. 3–4) which contact the lower surfaces of the rails end, which contact both sides of the right rail 2R.

Figure 5:
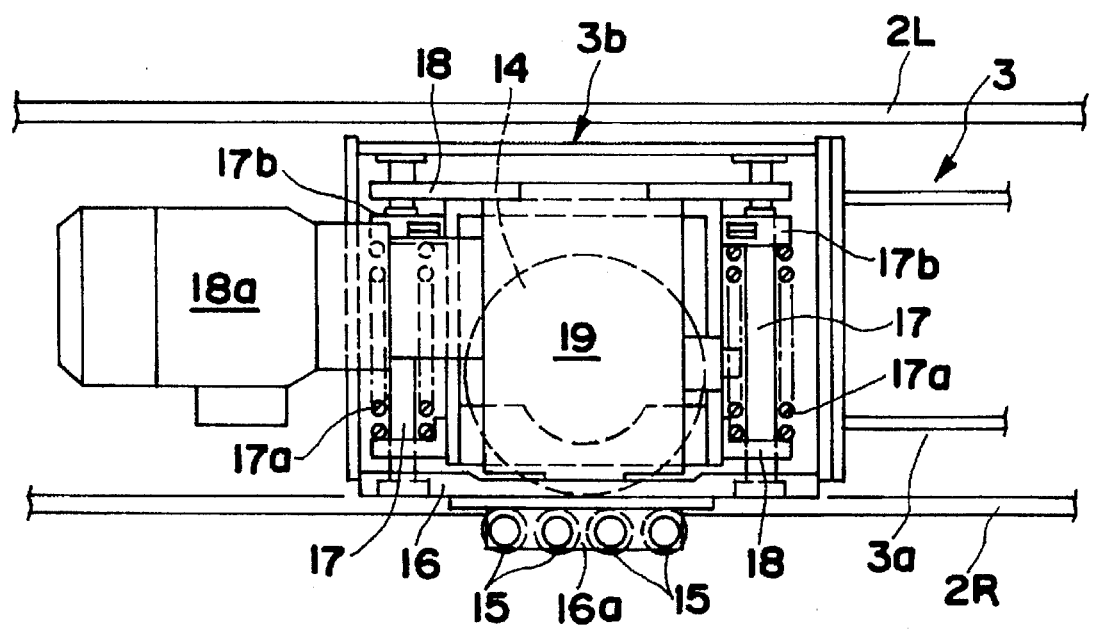
FIG. 5 is a partial plan view of the carrier, showing the drive of its traveler.
Figure 6:
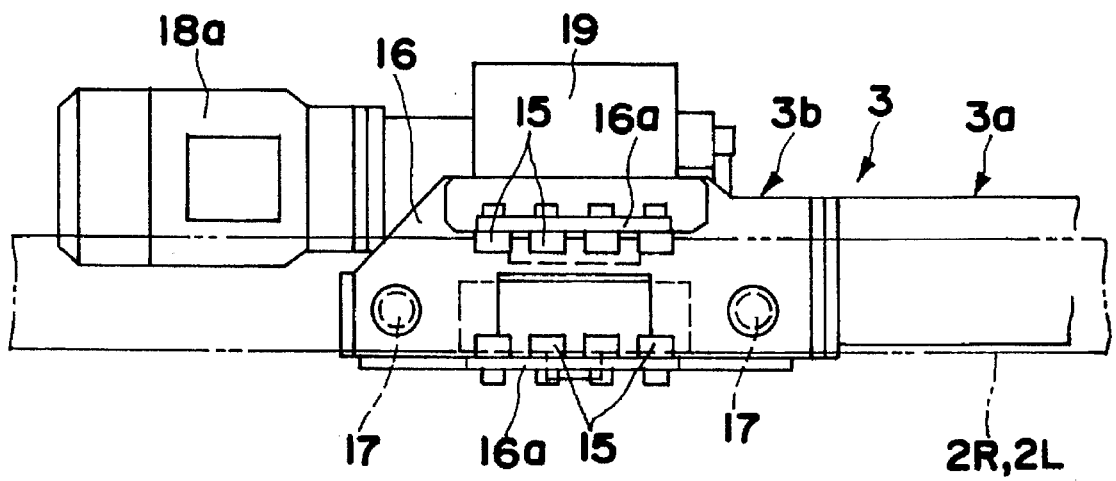
FIG. 6 is a partial side view of the carrier, showing the traveler drive.

As shown in FIGS. 5 and 6, the drive 3b has a large diameter drive roller 14 which contacts the inner side of the right guide rail 2R, and backing rollers 15 are arranged in rows in parallel with the rail 2R. The backing rollers 15 contact the outer side of the rail 2R opposite to the drive roller 14. The drive 3b is further provided with a frame 16. Front and rear slide guide rods 17 are attached to the frame 16, and extend horizontally perpendicularly to the rails 2R and 2L. The guide rods 17 support a movable form 18, which can slide along the roller and carries a drive unit 19. The drive unit 19 has a vertical output shaft (not shown) which is drivably attached to the drive roller 14. A spring shoe 17b is attached to each slidable rod 17. Each rod 17 supports a compression coil spring 17a around it between the shoe 17b and the movable frame 18. The springs 17a around the rods 17 urge the movable frame 18 toward the right rail 2R, so that the drive roller 14 engages or compressively contacts the inside of the rail 2R. The backing rollers 15 are mounted on the drive frame 16 through brackets 16a.

The drive unit 19 includes a drive motor 18a for rotating the drive roller 14. The motor 18a, its control and other electrical apparatus on the traveler 3 are fed or energized through a cable (not shown). When the carriage path L is a long one, the apparatus can be fed from a powered energizing rail through a non-contact or different current collector.

The normal rotation of the drive roller 14 by the motor 18a moves the traveler 3 forward along the guide rails 2R and 2L. The reverse rotation of the roller 14 moves the traveler 3 backwards.

Figure 7:
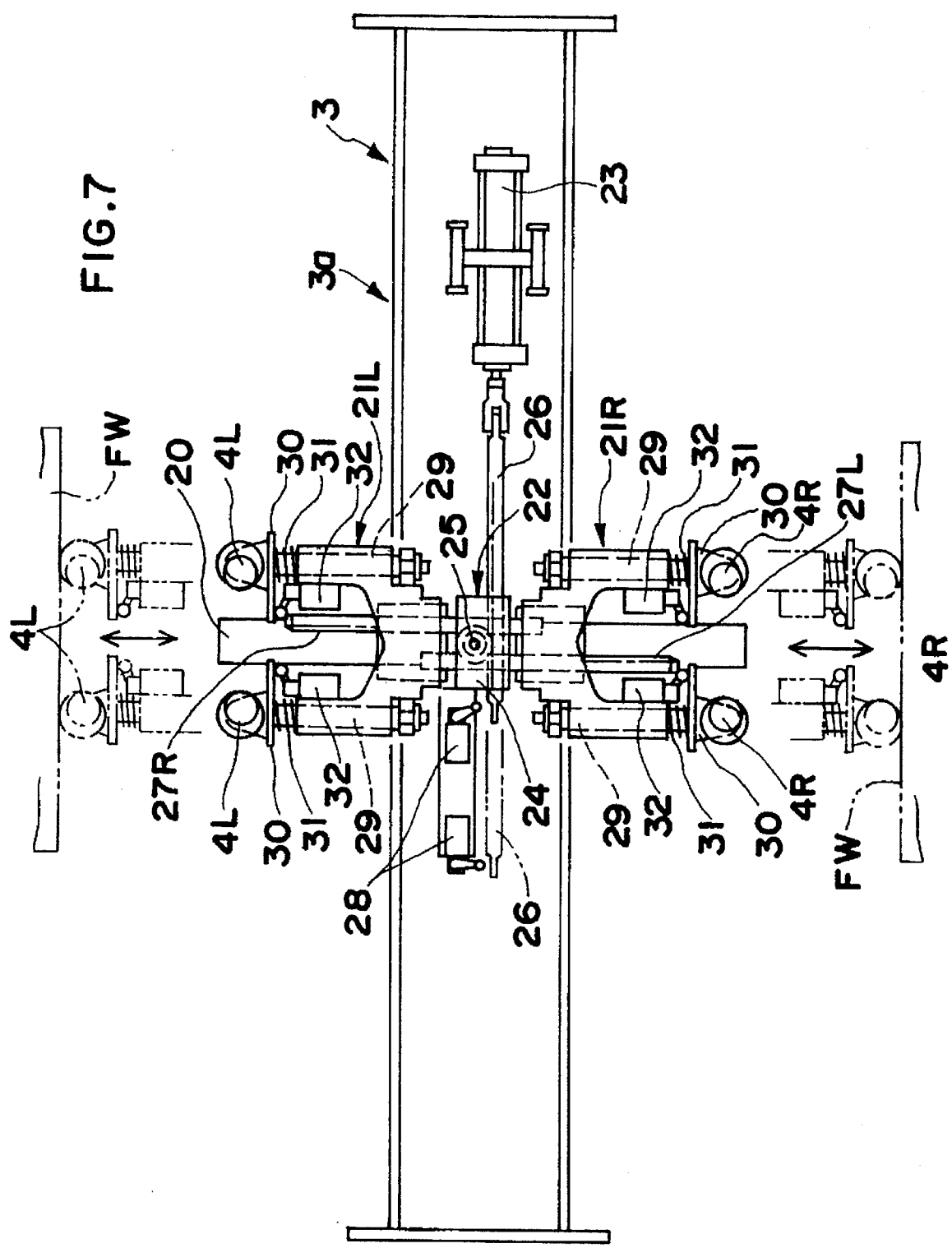
FIG. 7 is a partial plan view of the carrier, showing its front wheel direction regulation means.
Figure 8:
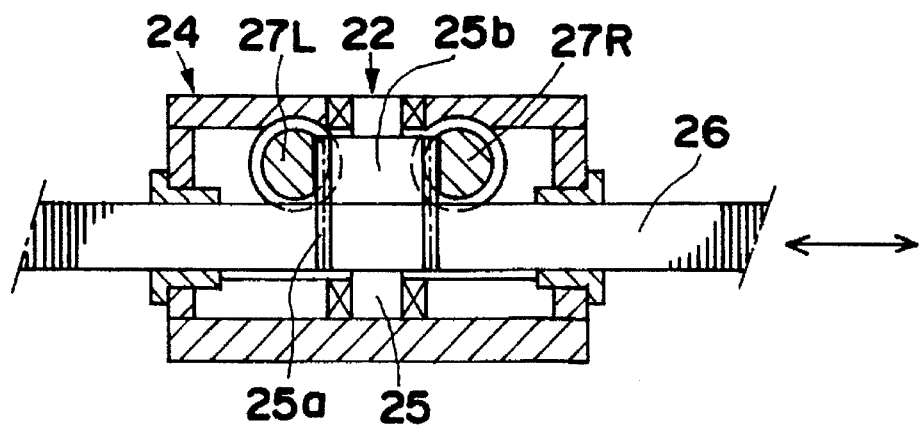
FIG. 8 is a partial side view in longitudinal cross-section of the carrier, showing the frame mover of the front wheel direction regulating means.

As shown in FIGS. 7 and 8, the front wheel direction regulator 5 carries the pairs of front and rear deflection preventors 4R and 4L. The regulator 5 includes a linear guide 20 and a pair of laterally movable frames 21R and 21L which are guided by the guide 20, and which are movable horizontally and perpendicularly to the guide rails 2R and 2L. The regulator 5 also includes a frame mover 22 for synchronously extending and retracting the frames 21R and 21L. The regulator 5 further includes a cylinder 23 for driving the frame mover 22 to move the frames 21R and 21L.

The frame mover 22 includes a rack and pinion mechanism. The carriage 3a has a supporting frame 24, rotatably mounting vertical rotating shaft 25. Fixed to the shaft 25 are an input pinion 25a and an output pinion 25b. The piston rod of the cylinder 23 is connected to an input rack 26 slidably carried in the supporting frame 24 parallel to the guide rails 2R and 2L. The teeth of the input rack 26 engage the input pinion 25a. A pair of output racks 27R and 27L are respectively connected to the laterally movable frame 21L and 21R. The supporting frame 24 supports the output racks 27R and 27L, which can slide on it horizontally and perpendicularly to the rails 2R and 2L. The racks 27R and 27L have teeth on their rods that oppose each other, which engage the output pinion 25b. The limits of sliding movement of the input rack 26 are detected by limit switches 28.

The reciprocation of the piston rod of the cylinder 23 drive the input rack 26 to rotate the pinions 25a and 25b. The rotation of the output pinion 25b reciprocates the output racks 27R and 27L in opposed directions. Consequently, the laterally movable frames 21R and 21L are laterally extended or retracted together, and each pair of the front and rear deflection prevention rollers 4R and 4L substantially simultaneously contact the inner side of the adjacent front wheel FW, at a position below the axis of the wheels FW.

The laterally movable frames 21R and 21L each slidably support front and rear horizontal support rods 29. The outer end of each rod 29 has a bracket 30 each rotatably supporting the lateral deflection preventor rollers 4R and 4L. Each rod 29 is urged laterally outwardly by a compression coil spring 31 between the associated frame 21R and 21L and bracket 30. The springs 31 are compressed as the lateral deflection preventors 4R and 4L contact the inner sides of the front wheels FW when the frames 21R and 21L move laterally outward, so that the frames 21R and 21L approach the rollers 4R and 4L. That approach is sensed by outer limit switches 32 mounted on the frames 21R and 21L by the brackets 30. This detects the contact between rollers 4R, 4L and the wheels FW, so that the cylinder 23 can be automatically stopped.

In the illustrated, above described embodiment of the present invention, the rack-and-pinion frame mover 22 together laterally reciprocating the laterally movable frames 21R and 21L with the deflection preventors 4R and 4L thereon. Therefore, if the front wheels FW are laterally dislocated from their centered positions, the frames 21R and 21L stop with only one preventor roller part 4R and 4L contacting the adjacent wheel FW. This condition can be determined from the conditions of the limit switches 32 for the respective rollers 4R and 4L, which enables a determination whether the wheels FW are centered.

Figure 1:
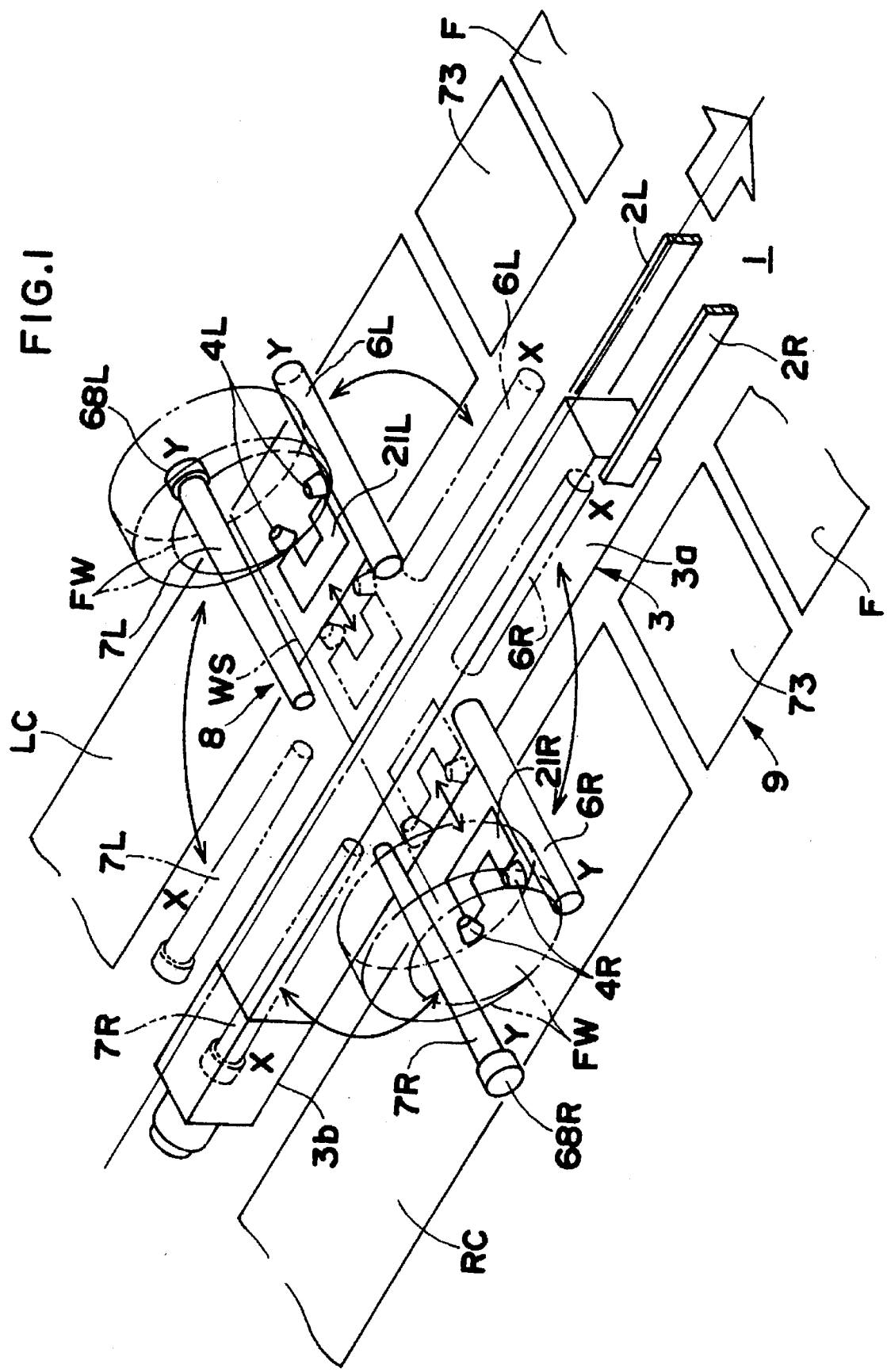
FIG. 1 is a schematic perspective view of a carrier according to the present invention.

As best shown in FIG. 1, the deflection preventors 4R and 4L are suitably tapered rollers, which have a smaller diameter on top, so that they contact with the inner surfaces of the tires on the front wheels FW and not directly the metal wheel rims. The tapered rollers are inclined so that their axes extend toward the axis WS of the wheels FW. The height or level of the wheel axis WS varies with the tire of the car body M. Therefore, the inclination of the tapered rollers is adjustable by assuming the position of the axis WS as if an average diameter tire is mounted.

In the above-described embodiment of the present invention, the carriage path L is linear along the conveyors RC and LC. Therefore, the front and rear deflection preventors 4R and 4L are arranged in parallel with the path L. The front wheels FW are regulated to be parallel with the path L. The front wheels FW are regulated to be parallel with the path L by the members 4R and 4L contacting with their inner surfaces, so that the car body M moves straight along the path L. If the path L horizontally curved, the front members 4R and 4L might become laterally dislocated from the rear members, so that the wheels FW might be forcedly turned in the curving direction of the path L. Actuators can be provided to move the front and rear pairs of members 4R and 4L independently from each other. The independent lateral movements of the members 4R and 4L could thus midway on the path L change the direction of the wheels FW as regulated by these members, thereby to change the direction of movement of the car body M.

Figure 9:
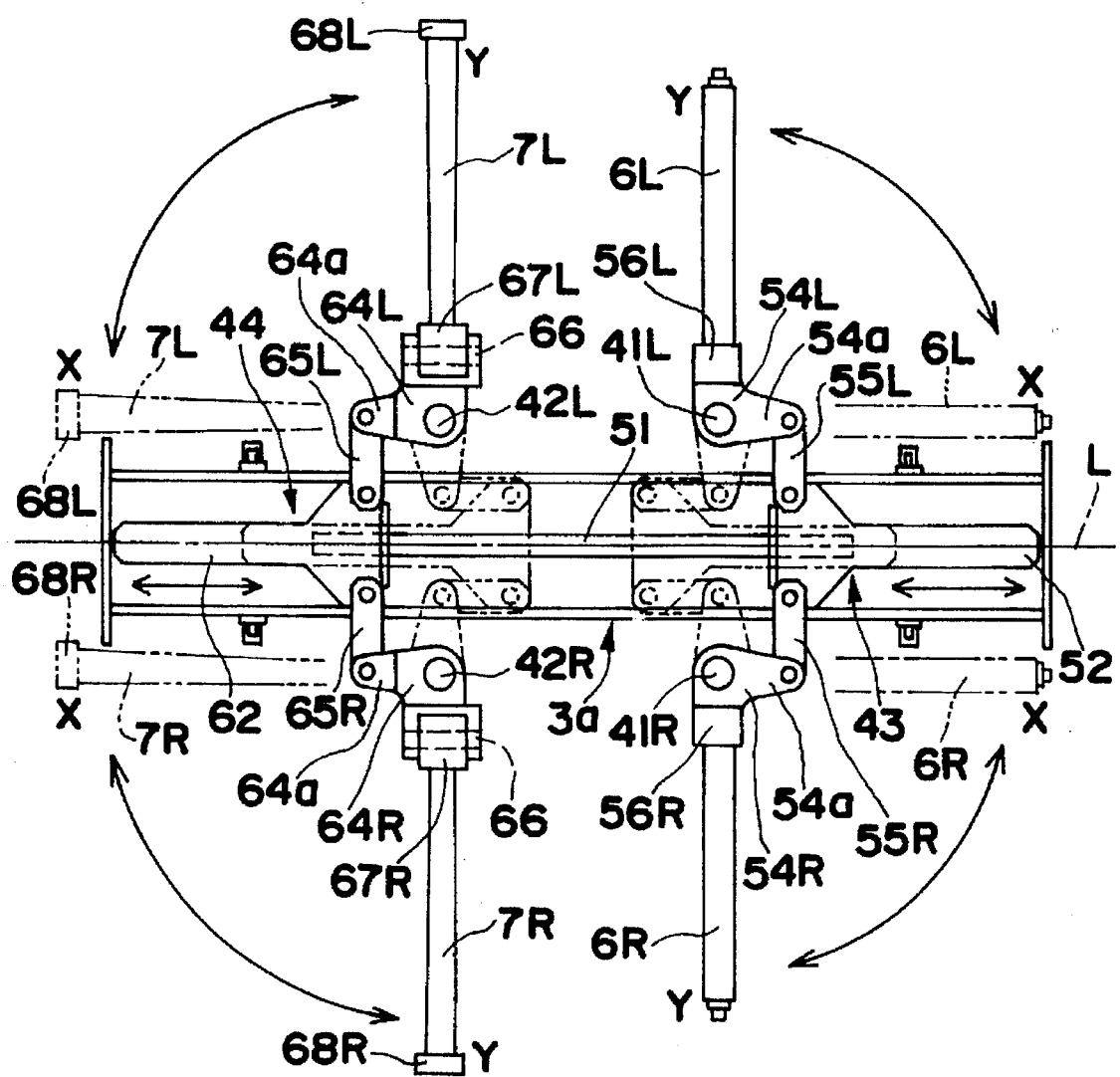
FIG. 9 is a partial plan view of the carrier, showing the front wheel holding means.
Figure 10:
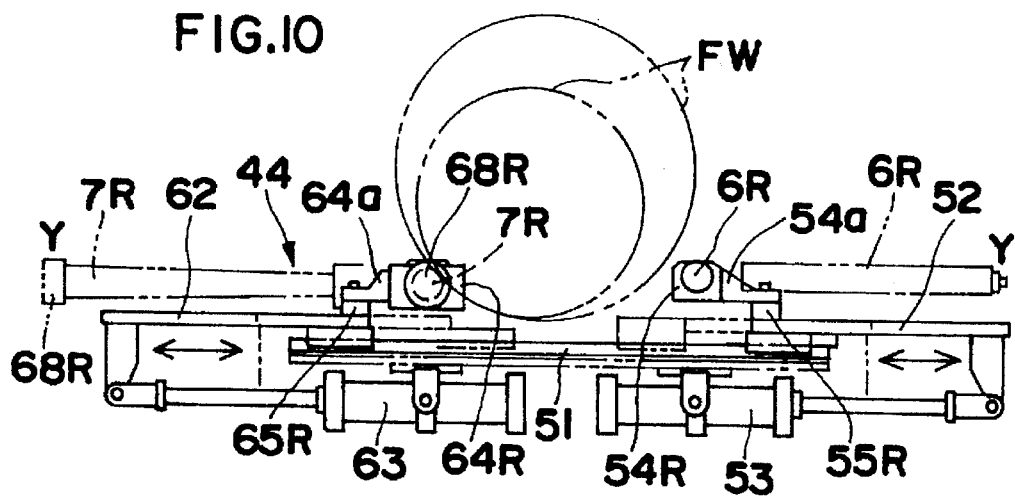
FIG. 10 is a partial side view of the carrier, showing the front wheel holding means.

As best shown in FIGS. 9 and 10, the front wheel holder 8, which includes the long rollers that are front holder members 6R and 6L and the front wheel holder members 7R and 7L behind the front wheel FW for pushing the wheels forward. The front and rear holder members 6R, 6L, 7R and 7L can be horizontally pivoted by an angle of 90 degrees on their respective vertical pins 41R, 41L, 42R and 42L by front and rear pivoting devices 43 and 44. Consequently, each of these members can be switched between a waiting or standby position x, in parallel with the carriage path L at a right angle to the path L and an operating position Y, which is shown in broken lines.

The carriage 3a of the traveler 3 includes a linear guide 51 in parallel with the carriage path L. The front pivoting device 43 has a movable frame 52 supported movably longitudinally through a slider on a front portion of the guide 51. The device 43 also includes an actuating cylinder 53 for reciprocating the movable frame 52. The front holder rollers 6R and 6L are supported as cantilevers by roller bearings 56R and 56L at the outer ends of L-shaped arm extensions 54R, 54L, respectively. The arm extensions 54R, 54L can pivot or turn on the vertical pins 41R and 41L, respectively. The outer ends of the front portions 54a and the arm extensions 54R and 54L are connected to the movable frame 52 through links 55R and 55L, respectively.

The rear pivoting device 44 has a movable frame 62, which is longitudinally supported through a slider on a rear portion of the linear guide 51. The rear pivoting device 44 also includes an actuating cylinder 63 for longitudinally reciprocating the movable frame 62. The front wheel rear holder members 7R and 7L are supported as cantilevers by roller bearings 67R and 67L, respectively. The roller bearings 67R, 67L are pivotably supported by horizontal pins 66 on the outer ends of L-shaped arm extensions 64R, 64L respectively. The arm extensions 64R, 64L can pivot on the vertical pins 42R, 42L, respectively. The rear outer ends 64a of the arms 64R, 64L are connected from the movable frame 62 through links 65R and 65L, respectively. Therefore, the holder rollers 7R, 7L can pivot upwardly on the horizontal pins 66 to avoid any obstacles on the carriage floors F.

The front and rear pivoting devices 43 and 44 are so constructed that when the front wheel front holders 6R, 6L, and the front wheel rear holders 7R, 7L are in their respective extended operating positions Y, the front and rear outer ends 54a and 64a of the L-shaped arm extensions 54R, 54L, 64R 64L are parallel to the moving directions of the movable frames 52, 62, and the links 55R, 55L, 65R, 65L are perpendicular to these directions. Accordingly, the moments which the holder members 6R, 6L, 7R, 7L receive from the front wheels FW are borne by the compressive stresses of the respective links 55R, 55L, 65R and 65L, so that there is no force generated moving the movable frames 52, 62. Therefore, these moments do not act on the actuating cylinders 53, 63 for reciprocating the frames 52, 62. As a result, there is no need for the cylinder 63 of the rear pivoting device 44 to bear directly the large reaction force applied particularly on the rear holder members 7R and 7L when a car body M is started which is 200 kg or heavier. It is therefore possible to make the cylinder 63 relatively small in size and capacity.

The front wheel rear holder members 7R and 7L are tapered rollers, which are larger in diameter toward their free ends. Consequently, when the rollers 7R and 7L contact the front wheels FW and push them forward, the directions of the pushing forces are inclined slightly toward the center of the car body M. The larger diameter free ends of the rollers 7R and 7L support receiving rollers 68R and 68L, respectively, which are even larger in diameter and are rotatable on them.

Figure 11:
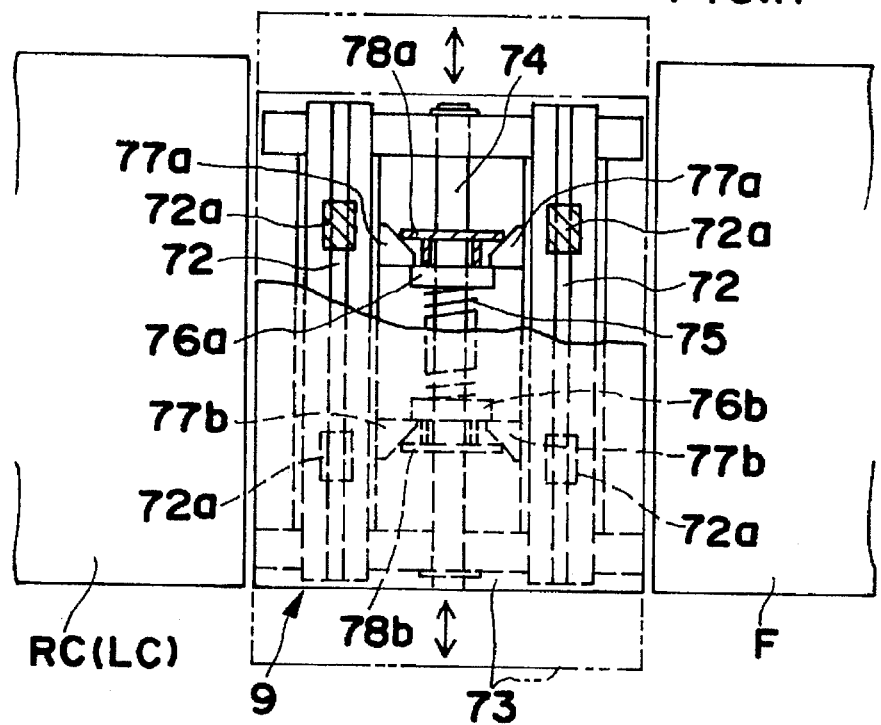
FIG. 11 is a partial plan view partially cut away of the carrier, showing one of its floating tables.
Figure 12:
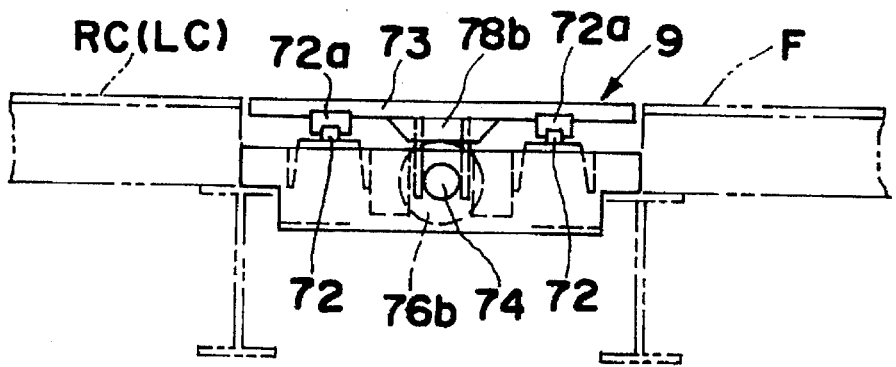
FIG. 12 is a partial side view of the carrier, showing the floating table.

The right and left floating tables 9 shown in FIG. 8 have identical structures. As shown in FIGS. 11 and 12 the tables 9 are placed into right and left pits 71, respectively, which are each formed in one of the carriage floors F. Each table 9 includes a table body 73, which is laterally movably supported through sliders 72a on a pair of right and left linear guides 72 in one of the pits 71. The table body 73 is flush with the associated floor F. A lateral guide shaft 74 extends between and parallel to the guides 72. Right and left spring shoes 76a and 76b are slidably supported. The shaft 74 also supports a compression coil spring 75 between the shoes 76a and 76b. The spring ends contact stoppers 77a and 77b, respectively, each associated with a shoe 76a, 76b. The table body 73 has right and left brackets 78a and 78b projecting from its lower surface and contacting the outer surfaces of the shoes 76a and 76b, respectively, as stopped by the respective stoppers 77a and 77b.

If the front wheels FW of a car body M conveyed by the conveyors RC and LC are not centered, only one of the right and left pairs of deflection prevention rollers 4R and 4L contact the inner side of the adjacent wheel FW due to the structure of the frame mover 22 of the front wheel direction regulator 5. The one-sided contact is detected by the signals from the outer limit switches Consequently, if a car body M is conveyed forward that is not centered and its front wheels FW have transferred onto the table bodies 73 of the floating tables 9, then the actuating cylinder 23 urges the lateral deflection rollers 4R and 4L outwardly. This causes the compressive force or pressure of the deflection preventor rollers 4R or 4L that contact the wheel FW to act on the car body M through this wheel FW. As a result, the wheels FW turn laterally toward their centering positions together with the car body M and table bodies 73. If the wheels FW have reached the centering positions, the rollers 4R and 4L contact the inner sides for both wheels FW at a nearly equal pressure. This condition is detected by the limit switches 32, so that the actuating cylinder 23 is automatically stopped.

When the table bodies 73 move toward the right or the left during centering, the brackets 78a or 78b on the other side compress the springs 75 through the adjacent spring shoes 76a or 76b. When the front wheels FW have moved from the table bodies 73 onto the carriage floors F after centering, the table bodies 73 having moved laterally with the wheels FW are automatically returned to their original positions by the restoring force or pressure of the springs 75.

When the front wheels FW have moved onto the table bodies 73 of the floating tables 9, the cylinder 23 of the front wheel direction regulator 5 is actuated again. Alternatively, if it is determined from signals detected from the limit switches 32 that the wheels FW of a car body M at the downstream end of the conveyors RC and LC are not centered, when the deflection preventors members 4R and 4L of the regulators 5 act on the wheels FW, it is possible to keep the actuating cylinder 23 operating, with the centering force acting on the wheels FW, while the car body M is carried forward until the wheels FW move onto the tables 9.

Explained below in detail is the method for conveying a car body M by the herein described carrier of the present invention.

A car body M is conveyed at a specified speed with its right and left wheels rolling on the conveyors RC and LC, respectively. The car body M being conveyed has hand brake, a gear shift, etc., which are not engaged or are neutral so that all of the wheels can rotate. The steered wheels which may be the front wheels FW, are directed nearly straight forward but are not fixed and may therefore be somewhat inclined. A detector (not shown) detects the arrival of a car body M at specified positions near the downstream ends of the conveyers RC and LC. This starts the traveler 3, which has waited for a new car body at the start end position on the carriage path L. The starting position is upstream from the downstream ends of the conveyors RC and LC. The traveler 3 travels from the starting position downstream together with the car body M on the conveyors RC and LC. Alternatively, the conveyors RC and LC can be stopped.

The actuating cylinder 23 of the front wheel direction regulator 5 moves the frame mover 22 and the laterally movable frames 21R and 21L outwardly. This makes the deflection preventors 4R and 4L contact the inner side of at least one of the front wheels FW. At the same time, the front and rear pivoting devices 43 and 44 of the front wheel holder 8 are driven to turn the front and rear holders 6R, 6L, 7R and 7L an angle of 90° from the waiting positions X to the operating positions Y. This extends the front and rear holders respectively in front of and behind the wheels FW. If the conveyors RC and LC are stopped, the traveler 3 is started to travel forward at this stage.

If the traveler 3 travels together with the conveyors RC and LC when a car body M has left the downstream ends of the conveyors the rears of the front wheels FW and push the wheels FW forward. If the conveyors RC and LC stop and only the traveler 3 travels, the movement causes the members 7R and 7L to push the wheels FW forward.

The rear holders 7R and 7L push the peripheral tire surfaces below the axes of the front wheels FW, so that a downward reaction is applied to these members. The receiving rollers 68R and 68L on the free ends of the members 7R and 7L are kept substantially horizontal. Therefore, the members 7R and 7L cannot be positioned under the wheels FW, but can securely push them to move the car body M forward. In addition, no excessive force acts on the root ends of the members 7R and 7L.

The rear holders 7R and 7L are tapered rollers, which are larger in diameter toward their free ends. Therefore, the directions of the pushing forces on the front wheels FW can be slightly inclined toward the center of the car body M and out of parallel with the direction with the direction of carriage. This enables a stable travel of the car body M. The members 7R and 7L can swing upwardly on the pins 66, which are parallel with the direction of carriage, thus easily to avoid any obstacles on the carriage floors F.

When the front wheels FW have transferred from the conveyors RC and RL to the table bodies 733 of the floating tables 9, if the car body M is not centered, the actuating cylinder 23 applies a centering force to the deflection preventors 4R and 4L to center the front wheel FW turned inward. This moves the front of the car body M laterally together with the table bodies 73 to center the front part. Then, the wheels FW are pushed to move from the table bodies 73 onto the carriage floors F, so that the rear of the car body M follows and moves laterally. As a result, the entire car body M is centered.

The traveler 3 is stopped when the car body M reaches the downstream end of the carriage path L (end of the travel path for the traveler 3). The actuating cylinder 23 of the from wheel direction regulator 5 retracts the laterally movable frames 21R and 21L with the deflection preventors 4R and 4L away from the front wheels FW. The from and rear pivoting devices 43 and 44 of the from wheel holders 8 are actuated to switch the front and rear holders 6R, 6L, 7R and 7L from their operating positions Y to their waiting positions X by turning these members by a horizontal angle of 90°. The traveler 3 is then moved backwards to return to the starting position of the path L.

The present invention has a number of highly advantageous features, (a) The traveler 3 travels along the carriage path L in the middle between the wheel movement lanes of the path L. The traveler 3 is the means that moves the front wheel direction regulator 5 and front wheel holder 8 together along the path L. The traveler 3 supports the right and left deflection preventors 4R and 4L of the front wheel direction regulator 5 so that each of the preventors can move laterally between the operating position, where it can contact the inner side of the adjacent front wheel FW of a car body, and the waiting position inwardly spaced from the wheel FW. The traveler 3 also supports the right and left, front holders 6R and 6L and the right and left, rear holders 7R and 7L of the front wheel holders 8 so that each holder can change between the operating position Y in front of, or behind the adjacent front wheel FW and the inward waiting position X out of the adjacent lines of movement of the front wheels.

This construction enables the single traveler 3 to support the deflection preventors 4R and 4L of the front wheel direction regulator 5 and the front and rear holders 6R, 6L, 7R and 7L of the front wheel holder 8. This enables the entire apparatus to remain simple and small.

(b) In this construction, the front and rear holders 6R, 6L, 7R and 7L are supported horizontally swingably at their ends which are facing outward and inward by 90° to change over from the operating positions Y to the waiting positions X. The rear holders 7R and 7L can turn backward and inward by 90° to change over from the operating positions Y to the waiting positions X. The rear holders 7R and 7L can turn backward and inward by 90° to change over from the operating positions Y to the waiting positions X.

This construction simplifies the switching mechanism of the holders 6R, 6L, 7R and 7L between the operating and waiting position, in comparison with the case where holders slide laterally to retract to their waiting positions between wheel movement lanes. It is also easy to make these holders sufficiently long enough to be able to handle large chances in the distance between the front wheels of a car body.

(c) In the foregoing structure of the present invention, the traveler 3 as the drive means includes the front and rear movable frames 52 and 62, which can move longitudinally. An arm extension 54a or 64a is provided at the pivotal end of each holder 6R, 6L, 7R, 7L. These extensions protrude forward or backward when the holder is in its operating position Y. The arm extensions 54a and 64a are connected from the movable frames 52 and 62, respectively, by the links 55R, 55L, 65R, 65L so that the longitudinal movements of the frames 52, 62 turns the holders 6R, 6L, 7R, 7L and the rear movable frame 62 are directed laterally when the rear holders 7R and 7L are in their operating positions Y.

This construction enables the compressive stresses of the links 65R and 65L to bear the large reaction forces applied onto the rear holders 7R and 7L pushing at their operating positions Y the front wheels FW of a very heavy car body M when the body M is started. As a result, there is no need to move the rear movable frame 62 longitudinally. Therefore, the actuating cylinder 63 for moving the frame 62 can be small in both size and in capacity.

(d) The deflection preventors 4R and 4L of the front wheel direction regulator 5 have a fight pair and a left pair of front and rear rollers for contact with sides of the front wheels below the axis of the wheels and each at two places forward and backward from the axis. The rollers are so inclined that their axis extend near the wheel axis.

This construction enables the direction of the front wheels FW to be regulated securely by the rollers 4R and 4L contacting with the front and rear places of the wheels FW. The rollers 4R and 4L contacting with the wheels FW do not make the rotating resistance of the wheels FW so high as to hinder the car body from traveling smoothly.

(e) The holders 6R, 6L, 7R and 7L of the front wheel holder 8 are long rollers.

This construction prevents a high rotating resistance of the front wheels. In addition, car bodies can be pushed with the front wheels FW held without hindrance even if the distance between the wheels FW varies with the car types within the range of the lengths of the rollers 6R, 6L, 7R and 7L.

(f) The rear holders 7R, 7L of the front wheel holder 8 are long tapered rollers, which have a larger diameter toward their free ends.

This construction slightly inclines toward the center of a car body M, and not parallel to the direction of carriage and the directions of the forces of the rollers 7R and 7L pushing the front wheels FW of the car body. It is therefore possible to make the car body M travel straight and in a stable manner.

(g) The rear holders 7R, 7L of the front wheel holder 8 are swingably supported at their pivotal ends in vertical planes on the longitudinal pins 66. The free ends of the members 7R and 7L support the receiving rollers 68R and 68L, which can rotate on the carriage floor.

This construction enables the floor F to bear through the receiving rollers 68R, 68L the downward reaction forces applied on the rear holders 7R, 7L contacting the circumferential tire surfaces of the front wheels FW of a car body below the axis of these wheels to push the wheels. Accordingly, the holders 7R, 7L are maintained nearly horizontal and from being positioned under the wheels FW. Therefore, the holders 7R, 7L can securely push the wheels FW to move the car body M forward. Furthermore, no excessive force is applied on the bases of the holders 7R, 7L. The rear holders 7R, 7L can swing upwardly on the pins 66, and can therefore easily avoid obstacles, if any, on the floor F.

(h) The frame mover 22 can simultaneously and together move the right and left pairs of deflection preventors 4R, 4L of the front wheel direction regulator 5 toward and away from each other. The actuating cylinder 23 presses these deflection preventors by mover 22 on sides of the front wheels FW of a car body. The floating tables 9 for receiving the front wheels FW of a car body include the table bodies 73 which can move laterally, and the springs 75 for keeping these bodies 73 in their neutral position. The wheels FW can be laterally centered when they are placed on the table bodies 73 by the operation of the reflection preventors 4R or 4L pushing against one of the wheels FW.

This construction enables the from wheels FW of a car body M, and eventually the whole car body, to be centered at the beginning of carriage or at a suitable time during carriage by using the deflection preventors 4R, 4L of the front wheel direction regulator 5, which is necessary to move the car body M along the carriage path, in cooperation with only the floating tables 9 and without requiring any other motive power.

I claim:

1. A carrier of car bodies having front wheels and rear wheels mounted from respective front and rear axes, by rolling the car body on the wheels on a floor along a generally horizontal direction of carriage, the carrier comprising (i) a from wheel direction regulator having right and left deflection preventors adapted for contacting the sides of the front wheels while permitting rotation of the front wheels, for regulating the orientation of the front wheels to the direction of carriage, (ii) a front wheel holder having (a) a rear holder disposed behind the front wheel for rotatingly pushing the car body forward in the direction of carriage, and (b) a front holder for permitting rotation of the front wheels while preventing the car body from being pushed too far forward and away from said rear holder, said rear and front holders each having a free outer end and an inner end, and (iii) a drive for moving said direction regulator and said holder in the direction of carriage.

2. The carrier of claim 1, wherein right and left movement lanes are disposed in the direction of carriage, (i) said drive comprising a traveler for movement between the movement lanes, (ii) each of said deflection preventors being laterally movably supported from said traveler wherein said traveler is movable between an operating position in which said preventor is adapted to contact the inside of an adjacent front wheel, and a waiting position spaced inwardly from the wheel, (iii) the front wheel holder having means switchably supported from said traveler between a front operating position in front of a front wheel adjacent thereto, and a front waiting position inwardly from the contact with the front wheel, each of said rear holders being switchably supported by said traveler between a rear operating position behind a front wheel adjacent thereto and a rear waiting position spaced inwardly from the wheel.

3. The carrier of claim 2, further comprising a vertical pin each for horizontally pivotably supporting one end of each of said front and rear holders from said traveler, said front holders being switchable from their operating positions to their waiting positions by pivoting each holder forward and inward by an angle of about 90°, said rear holders being switchable from their operating positions to their waiting positions by pivoting each holder backward and inward by an angle of about 90°.

4. The carrier of claim 3, wherein said traveler further includes longitudinally movable front and rear frames, the pivotably supported end of each of said front and rear holders further comprising an extension extending longitudinally with respect to the direction of carriage when the associated holder is in its operating position, a link disposed at least between each of said rear holder members for interconnecting said extension with an adjacent movable frame so that a longitudinal movement of said frame turns an associated holder by 90°, said rear movable frame being laterally directed when an associated holder is in its operating position.

5. The carrier of claim 1, wherein each of said deflection preventors has a pair of front and rear rollers for contacting the side of a front wheel adjacent thereto forwardly and rearwardly from and below the axis of the wheel, said rollers being inclined with their axes pointing substantially toward the axis of the wheel.

6. The carrier of claim 1, wherein each of said holders is a long and optionally tapering roller.

7. The carrier of claim 1, wherein each of said rear holders is a long, tapering roller having a larger diameter at its free, outer end.

8. The carrier of claim 1, further comprising a plurality of horizontal pins each vertically swingably supporting the inner end of the rear holder, and a plurality of rollers each mounted from an outer end of the rear holder and adapted to rotate on the floor.

9. The carrier of claim 1, further comprising (i) means for simultaneously moving said deflection preventors in lateral symmetry to each other, (ii) means for pressing said deflection preventors by said means for moving onto the sides of the front wheels, and (iii) a plurality of floating tables each having a laterally movable table body for receiving a respective front wheel, and each having a spring for maintaining said table body in a neutral position, whereby the front wheels can be laterally centered by the deflection preventor pushing the front wheel on the table body.

* * * * *